(12) United States Patent
Katsura et al.

(10) Patent No.: US 10,840,786 B2
(45) Date of Patent: Nov. 17, 2020

(54) ROTARY ELECTRIC MACHINE HAVING MAGNETIC FLUX SUPPLIED FROM A FIELD COIL

(71) Applicant: EXEDY CORPORATION, Neyagawa (JP)

(72) Inventors: Hitoshi Katsura, Neyagawa (JP); Taichi Kitamura, Neyagawa (JP); Kimitaka Uemura, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 13 days.

(21) Appl. No.: 16/408,833

(22) Filed: May 10, 2019

(65) Prior Publication Data

US 2019/0372443 A1 Dec. 5, 2019

(30) Foreign Application Priority Data

May 31, 2018 (JP) .................................. 2018-105408

(51) Int. Cl.
*H02K 21/04* (2006.01)
*H02K 1/22* (2006.01)
(Continued)

(52) U.S. Cl.
CPC ........... *H02K 21/048* (2013.01); *H02K 1/226* (2013.01); *F02N 11/04* (2013.01); *H02K 21/00* (2013.01); *H02K 21/02* (2013.01); *H02K 21/046* (2013.01)

(58) Field of Classification Search
CPC .......... H02K 1/22; H02K 1/226; H02K 21/00; H02K 21/02; H02K 21/024; H02K 21/046; H02K 21/048; F02N 11/04
(Continued)

(56) References Cited

U.S. PATENT DOCUMENTS 3,555,327 A 1/1971 Stanley
3,663,846 A 5/1972 Wagner et al.
(Continued)

FOREIGN PATENT DOCUMENTS

DE 102011085878 A1 5/2013
EP 0771061 A2 5/1997
(Continued)

OTHER PUBLICATIONS

Extended European Search Report dated Nov. 4, 2019 for the corresponding European Patent Application No. 19177037.9, 8 pp.

*Primary Examiner* — Tulsidas C Patel
*Assistant Examiner* — Rashad H Johnson
(74) *Attorney, Agent, or Firm* — United IP Counselors, LLC (57) ABSTRACT

A brushless winding field type rotary electric machine equipped with a stator, a field core having a field coil, and a rotor. The field coil is in parallel with the rotor in the rotary member rotation shaft axial direction. The rotor has first and second magnetic poles respectively having first and second annular sections and first and second pawl sections, and an annular-shaped rotor core having first and second fitting sections into which the first and second pawl sections are respectively fitted, the first and second fitting sections being provided alternately along the circumferential direction, and the rotor core having through hollow sections each disposed between the first and second fitting sections. The first magnetic pole and the second magnetic pole are fixed to the rotor core without making contact with each other and the rotor core is constituted by stacking electromagnetic steel sheets in the axial direction.

6 Claims, 8 Drawing Sheets

(51) Int. Cl.
*F02N 11/04* (2006.01)
*H02K 21/00* (2006.01)
*H02K 21/02* (2006.01)

(58) Field of Classification Search
USPC ............ 310/24, 33, 66, 67 A, 67 R, 154.27,
310/156.66, 156.67, 216.025, 216.031,
310/216.038, 216.039, 216.074, 216.075,
310/216.087
See application file for complete search history.

(56) References Cited

U.S. PATENT DOCUMENTS

| | | | |
|---|---|---|---|
| 8,018,111 B2* | 9/2011 | Kinjou | H02K 21/14 |
| | | | 310/156.57 |
| 8,330,319 B2* | 12/2012 | Hsu | H02K 1/246 |
| | | | 310/164 |
| 9,083,225 B2* | 7/2015 | Tonogi | H02K 1/148 |
| 2004/0232794 A1* | 11/2004 | Hsu | H02K 21/046 |
| | | | 310/156.56 |
| 2009/0283344 A1 | 11/2009 | Arnold et al. | |
| 2014/0292132 A1* | 10/2014 | Kazmin | H02K 15/03 |
| | | | 310/156.01 |
| 2016/0105088 A1* | 4/2016 | Narita | H02K 1/145 |
| | | | 310/216.091 |

FOREIGN PATENT DOCUMENTS

| | | |
|---|---|---|
| JP | 2001-037108 A | 2/2001 |
| JP | 3445492 B2 | 9/2003 |
| JP | 2010-516558 A | 5/2010 |

\* cited by examiner

ROTARY ELECTRIC MACHINE HAVING MAGNETIC FLUX SUPPLIED FROM A FIELD COIL

BACKGROUND OF THE INVENTION

Technical Field

The present invention relates to a brushless winding magnetic field type rotary electric machine disposed around the outer periphery of a rotary member.

Background Art

Figure 8:
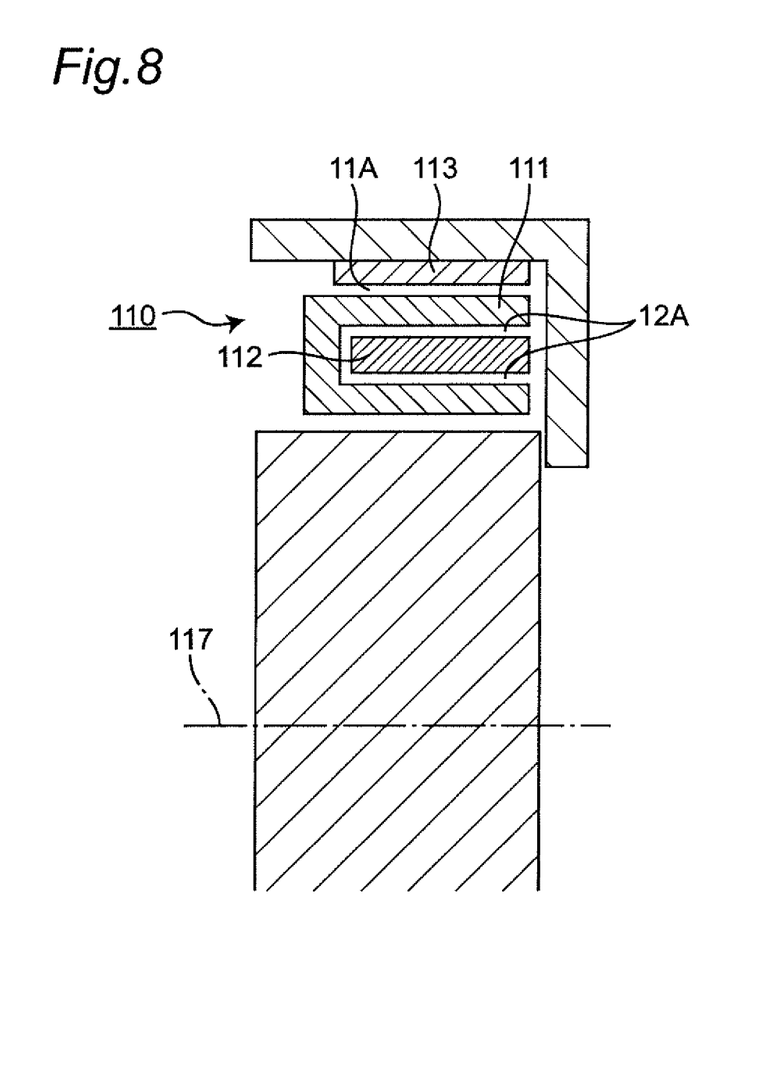
FIG. 8 is a sectional schematic view showing the conventional rotary electric machine.

For example, as a rotary electric machine disposed between an engine and a transmission along a rotation shaft, a rotary electric machine for supplying a magnetic flux from a field coil that is stationary with respect to a rotor is proposed conventionally. For example, in a brushless winding field type rotary electric machine 110 disclosed in Patent Document 1, as shown in FIG. 8, a first air gap 11A is provided between a stator 113 and a rotor 111, and a second air gap 12A is provided between a field coil 112 and the rotor 111. Both the air gaps extend along the axial direction of a rotation shaft 117. Furthermore, the rotor 111 is made by cutting iron. Moreover, Patent Document 2 proposes a structure in which a rotary electric machine is disposed around the outer periphery of a starting device.

PRIOR ART REFERENCE

Patent Documents

[Patent Document 1] JP 3445492 B1
[Patent Document 2] JP 2010-516558 T

SUMMARY OF THE INVENTION

Problem to be Solved by the Invention

However, since the field coil 112, the rotor 111 and the stator 113 having diameters different from one another are disposed coaxially with the rotation shaft 117 in the conventional rotary electric machine 110, there are strict restrictions on disposing these components in a narrow space, whereby there are problems that the degree of freedom in design is limited and the output performance of the rotary electric machine 110 is limited.

Furthermore, in the conventional rotor 111, since the rotor is formed of a massive member made from a ferrous material, an eddy current is generated and heat generation by electric resistance occurs, thereby having a problem that the so-called "iron loss" is large.

An object of the present invention is to provide a rotary electric machine capable of not only improving the degree of freedom in design but also reducing the "iron loss".

Means for Solving the Problems

The present invention features a brushless winding field type rotary electric machine positioned between a rotary member and a stationary case, being equipped with:

a stator held in the stationary case and internally equipped with an AC coil for generating a rotating magnetic field by an AC current; a field core held in the stationary case and internally equipped with a field coil excited by a DC current; and a rotor disposed around the outer periphery of the rotary member and held so as to be rotatable with respect to the stator and the field coil, wherein the field coil is disposed in parallel with the rotor in the axial direction of the rotation shaft of the rotary member, the rotor is equipped with:

a first magnetic pole having a plurality of first pawl sections extending in the axial direction of the rotation shaft, a second magnetic pole having a plurality of second pawl sections extending in the axial direction of the rotation shaft, and a rotor core having an annular shape, the first magnetic pole and the second magnetic pole are fixed to the rotor core via the first pawl sections and the second pawl sections, respectively, without making contact with each other, the rotor core is constituted by stacking electromagnetic steel sheets in the axial direction of the rotation shaft, and the stacked electromagnetic steel sheets are electrically insulated mutually although they allow a magnetic flux to pass through.

Effect of the Invention

With the rotary electric machine according to the present invention, the rotor and only either one of the stator and the field coil may merely be disposed coaxially and on different diameters with the rotation shaft in a narrow space between the inner peripheral side of the stationary case and the outer peripheral side of the rotary member, whereby the degree of freedom in design is enhanced and the output performance of the rotary electric machine can be improved. In addition, since the rotor core of the rotor is constituted by stacking the electromagnetic steel sheets in the axial direction of the rotation shaft, the "iron loss" can be reduced and energy efficiency can be improved.

DETAILED DESCRIPTION

An embodiment of the present invention will be described below in detail referring to the accompanying drawings.

Figure 1:
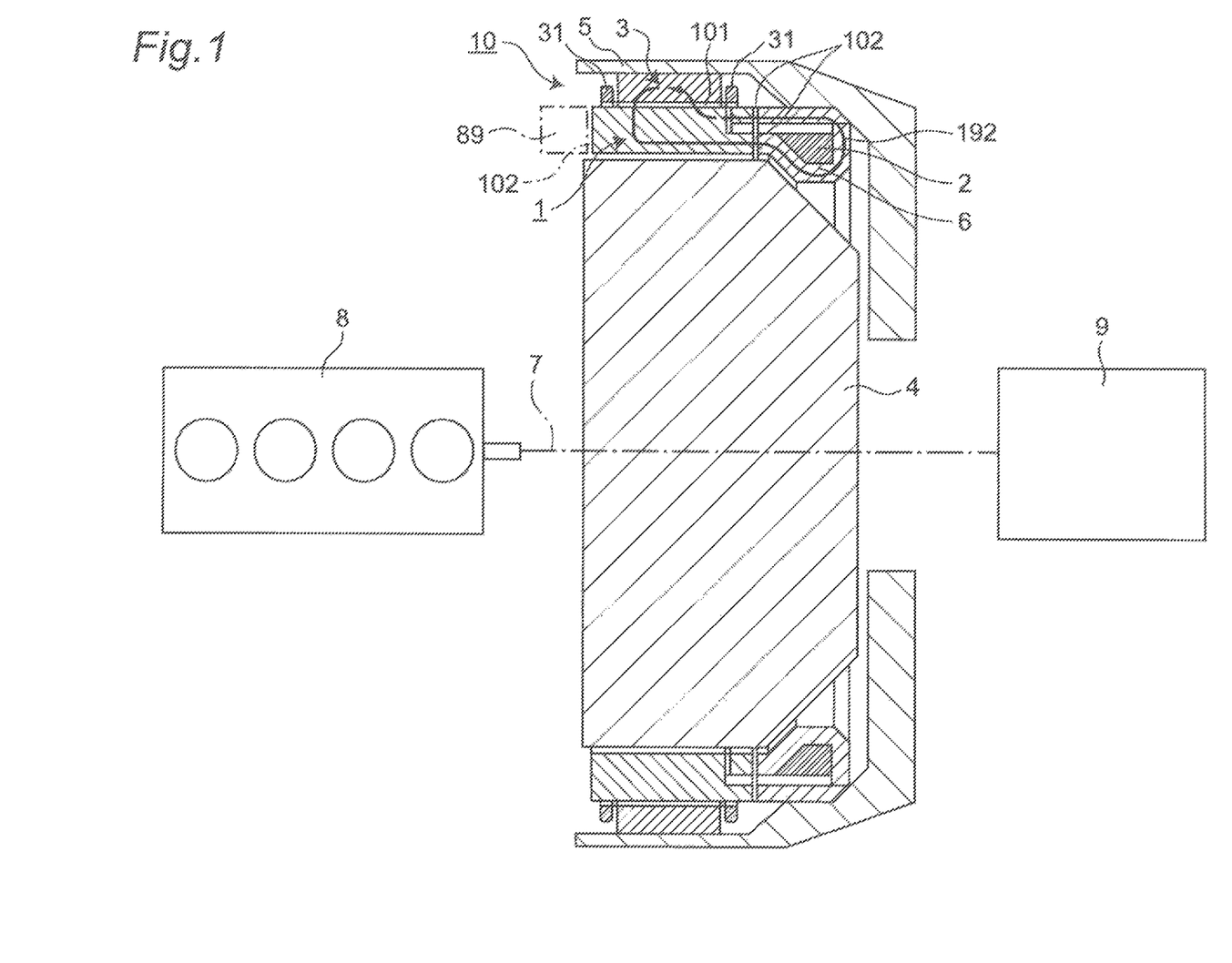
FIG. 1 is a view showing a cross section of a rotary electric machine according to a first embodiment of the present invention being cut along a direction perpendicular to a rotation shaft and also showing the arrangement relationship between the rotary electric machine and an engine and a transmission.

As shown in FIG. 1, the rotary electric machine according to this embodiment is a brushless winding field type rotary electric machine 10 that is disposed between an engine 8 and a transmission 9 along a rotation shaft 7 and positioned between a case 5 containing a starting device 4 and the starting device 4. This rotary electric machine 10 is equipped with at least a stator 3, a field coil 2 and a rotor 1.

The stator 3 is unrotatably fixed to and held in the case 5, is constituted of a cylindrical member having a plurality of slots in which an AC coil 31 is wound, is provided with the AC coil 31 inside, and generates a rotating magnetic field by the AC current flowing in the AC coil 31.

The field coil 2 is disposed while being shifted from the stator 3 and the rotor 1 along the rotation shaft 7, is fixed to and held in the case 5 on the transmission 9 side of the stator 3, and is excited by a DC current. A field core 6 has the field coil 2 inside. However, the field coil 2 may be disposed while being shifted from the stator 3 and the rotor 1 along the rotation shaft 7 to the engine 8 side of the stator 3 via a second air gap 102, instead of the transmission 9 side of the stator 3 (see the region 89 indicated by a dashed line in FIG. 1).

The rotor 1 is disposed so as to be fixed to the outer periphery of the starting device 4. The outer peripheral face of the rotor 1 is opposed to the inner peripheral face of the stator 3, and the end face on the transmission 9 side of the rotor 1 is opposed to the end face on the engine 8 side of the field coil 2. The rotor 1 is held so as to be rotatable with respect to the stator 3 and the field coil 2 around the rotation shaft 7.

A first air gap 101 is formed between the stator 3 and the rotor 1, thereby delivering a magnetic flux between the stator 3 and the rotor 1. The first air gap 101 is a gap extending along the axial direction of the rotation shaft 7 between the inner peripheral face of the stator 3 and the outer peripheral face of the rotor 1.

The second air gap 102 is formed between the field core 6 and the rotor 1, thereby delivering the magnetic flux between the field coil 2 and the rotor 1. The second air gap 102 is a gap extending along the radial direction perpendicular to the axial direction of the rotation shaft 7 between the field core 6 and the rotor 1, more specifically, between the end face on the transmission 9 side of the rotor 1 and the end face on the engine 8 side of the field core 6 in the axial direction of the rotation shaft 7.

Hence, the field coil 2 is disposed in parallel with the rotor 1 while being shifted in the axial direction of the rotation shaft 7 via the second air gap 102.

Figure 2:
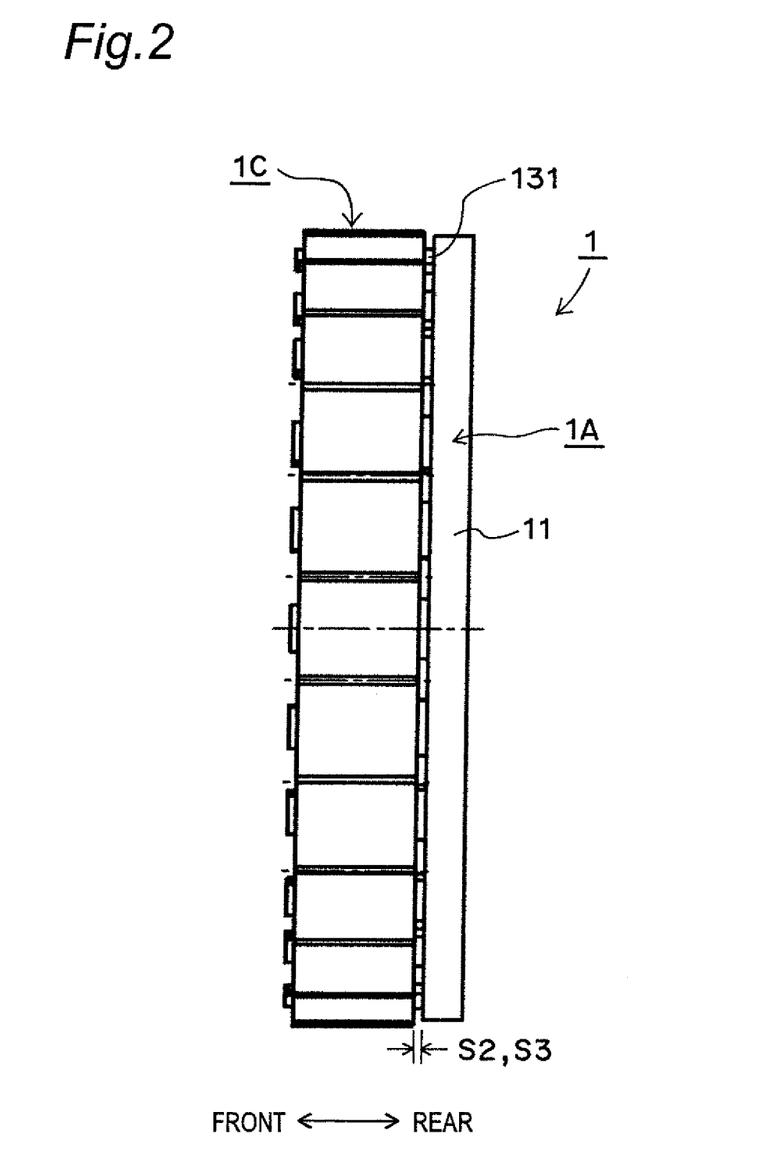
FIG. 2 is a side view showing a rotor.
Figure 3:
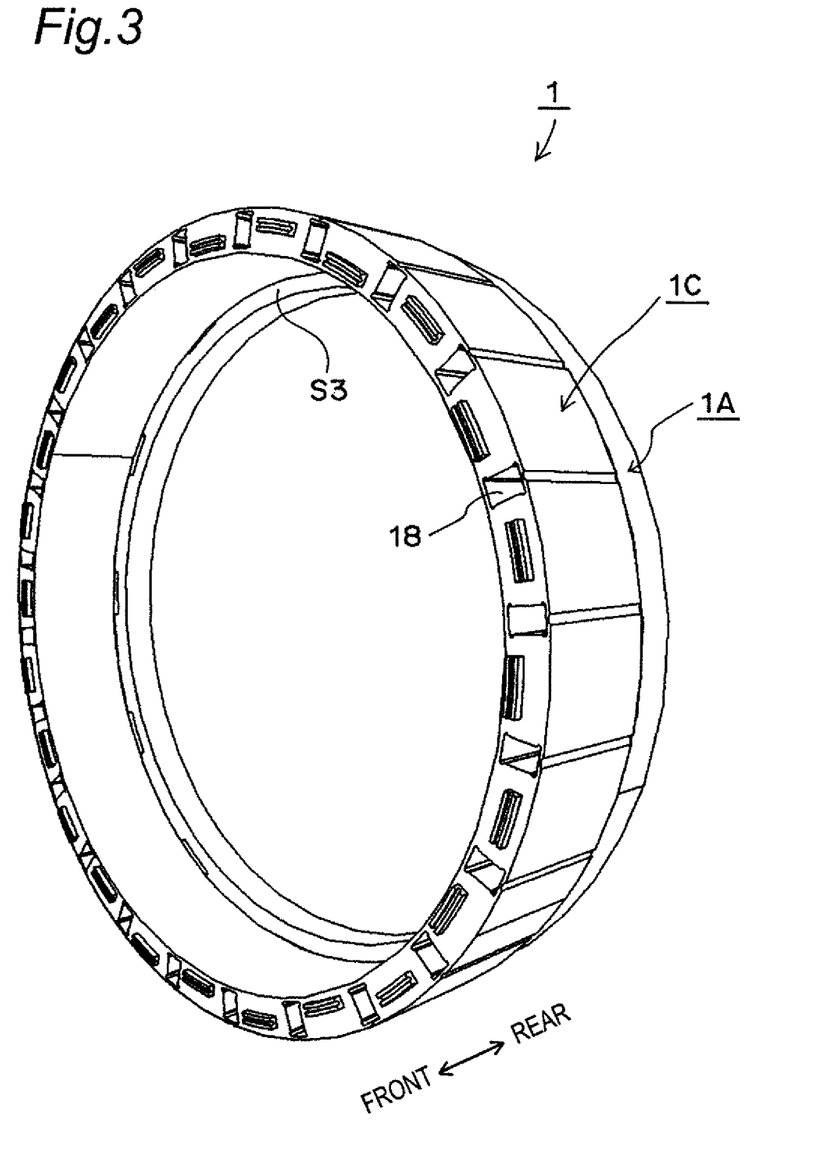
FIG. 3 is a perspective view showing the rotor, as viewed from the front in the axial direction.
Figure 4:
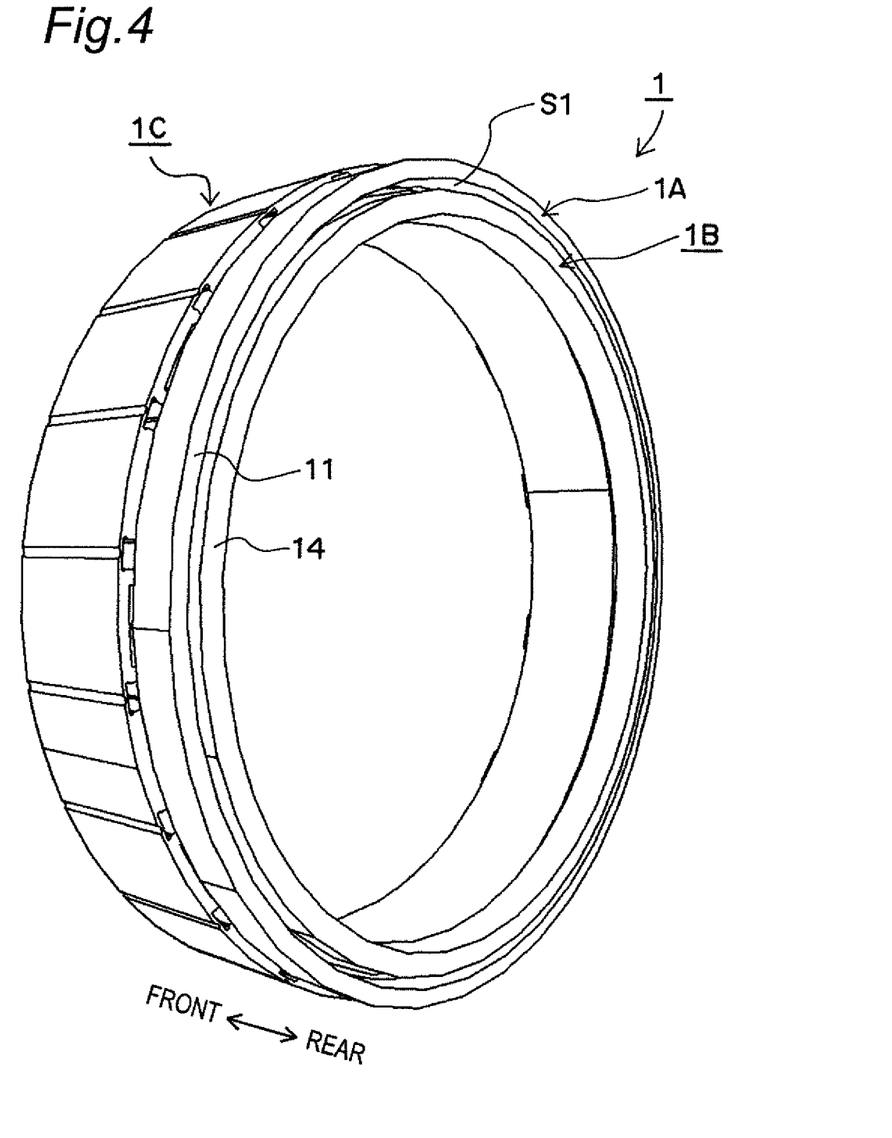
FIG. 4 is a perspective view showing the rotor, as viewed from the rear in the axial direction.
Figure 5:
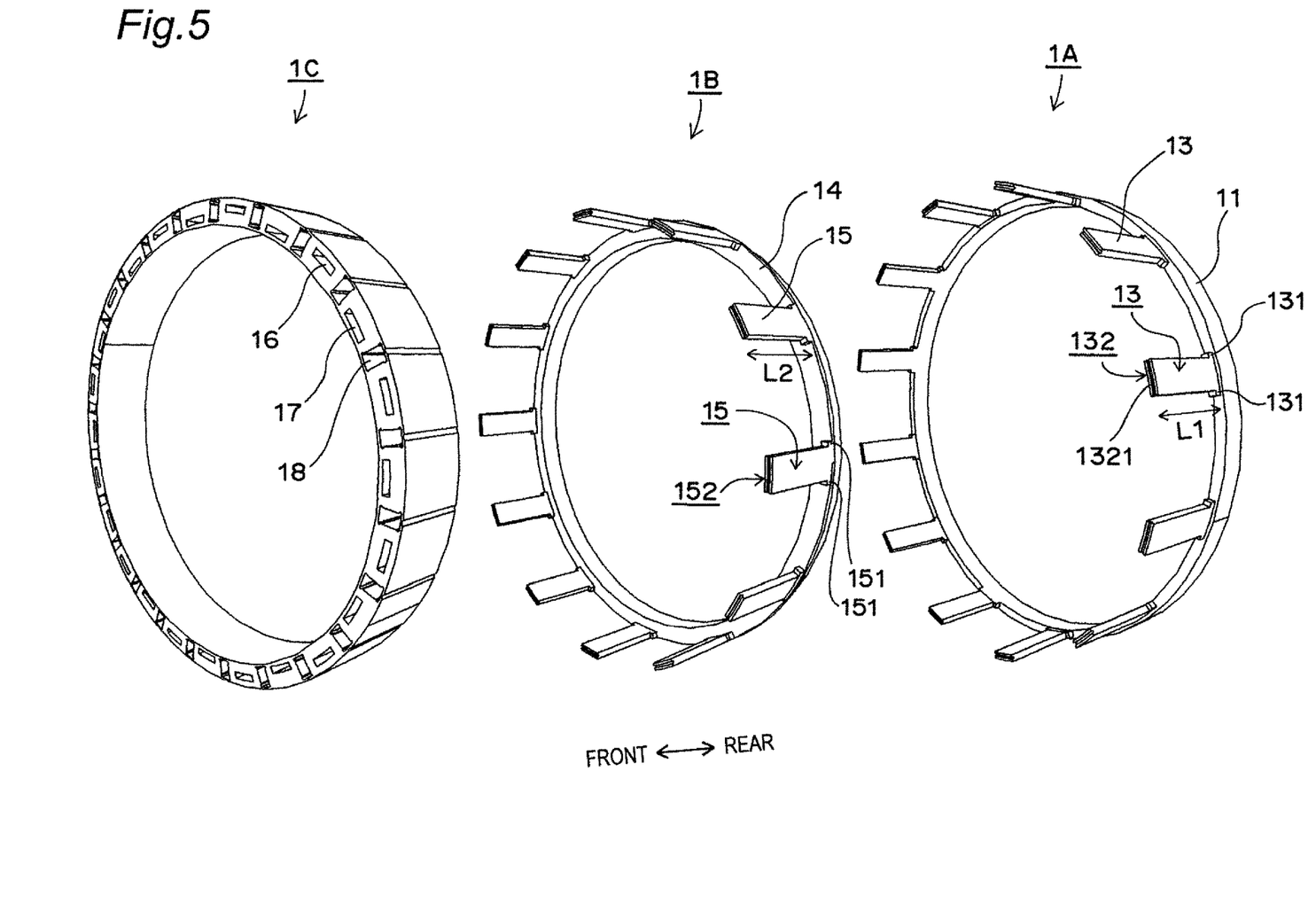
FIG. 5 is an exploded perspective view showing the rotor.

Furthermore, as show in FIGS. 2 to 5, the rotor 1 is constituted by combining a first magnetic pole 1A, a second magnetic pole 1B and a rotor core 1C. FIG. 2 is a side view showing the rotor 1. FIG. 3 is a perspective view showing the rotor 1, as viewed from the front in the axial direction (on the side of the engine 8). FIG. 4 is a perspective view showing the rotor 1, as viewed from the rear in the axial direction (on the side of the transmission 9). FIG. 5 is an exploded perspective view showing the rotor 1. Permanent magnets (described later) are not shown in FIGS. 2 to 5.

Figure 6:
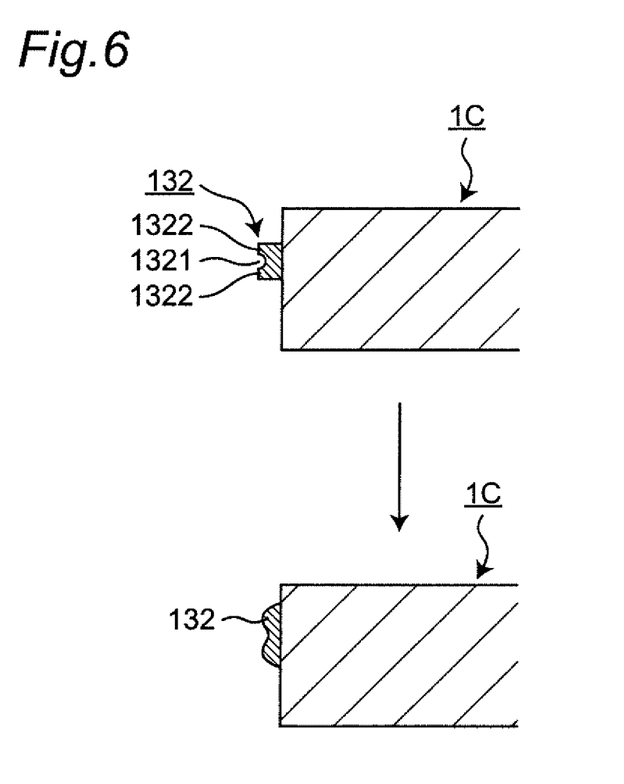
FIG. 6 is a side partial view showing the caulking section of the first nail section of the first magnetic pole of the rotor and showing the caulked state thereof.

The first magnetic pole 1A is made from a soft magnetic material, such as iron, and has a plurality of first pawl sections 13 having, for example, a rectangular thin-plate shape, and protruding from a first annular section 11 in the axial direction of the rotation shaft 7. The first pawl sections 13 are disposed at constant intervals, for example, at equal intervals, in the circumferential direction. Furthermore, the lengths L1 of all the first pawl sections 13 in the axial direction are the same. At the base section of each first pawl section 13, step sections 131 extending to both the sides of the base section in the circumferential direction are formed. Moreover, a caulking section 132 is formed at the tip end section of the first pawl section 13. The caulking section 132 has a groove 1321 extending in the circumferential direction. As shown in FIG. 6, the caulking section 132 is caulked by applying pressure to the groove 1321 so as to press and expand both the edge sections 1322 provided along the groove 1321, that is to say, by expanding both the edge sections in the radial direction.

The second magnetic pole 1B is made from a soft magnetic material, such as iron, and has a plurality of second pawl sections 15 having, for example, a rectangular thin-plate shape, and protruding from a second annular section 14 in the axial direction of the rotation shaft 7. The second pawl sections 15 are disposed at constant intervals, for example, at equal intervals in the circumferential direction. Furthermore, the lengths L2 of all the second pawl sections 15 in the axial direction are the same. It is herein assumed that L1=L2. At the base section of each second pawl section 15, step sections 151 extending to both the sides of the base section in the circumferential direction are formed. Moreover, a caulking section 152 is formed at the tip end section of the second pawl section 15. The caulking section 152 also has a groove 1521 extending in the circumferential direction. As shown in FIG. 6, the caulking section 152 is caulked by expanding both the edge sections thereof in the radial direction. When it is assumed that the inside diameter of the first annular section 11 of the first magnetic pole 1A is D1 and that the outside diameter of the second annular section 14 of the second magnetic pole 18 is D2, D1 is larger than D2.

The rotor core 1C is an annular member and has first fitting sections 16 into which the first pawl sections 13 are fitted and second fitting sections 17 into which the second pawl sections 15 are fitted, the first fitting sections 16 and the second fitting sections 17 being provided alternately along the circumferential direction. Furthermore, the rotor core 1C has through hollow sections 18, each of which is disposed between the first fitting section 16 and the second fitting section 17. Furthermore, the rotor core 1C is constituted by stacking electromagnetic steel sheets in the axial direction of the rotation shaft 7. The stacked electromagnetic steel sheets are electrically insulated mutually although they allow a magnetic flux to pass through. An endplate (not shown) having an annular plate shape and made from a nonmagnetic material, such as aluminum or austenitic stainless steel, may be disposed at the forefront section of the rotor core 1C in the axial direction. The electromagnetic steel sheets conceptually contain soft ferrite or the like.

The rotor 1 is assembled as described below. In other words, the first pawl sections 13 of the first magnetic pole 1A are inserted into the first fitting sections 16 of the rotor core 1C from behind in the axial direction, the step sections 131 are made contact with the rotor core 1C and the caulking sections 132 are exposed from the rotor core 1C, the second pawl sections 15 of the second magnetic pole 1B are inserted into the second fitting sections 17 of the rotor core 1C from behind in the axial direction, and the step sections 151 are made contact with the rotor core 1C and the caulking sections 152 are exposed from the rotor core 1C. And then, the caulking sections 132 of the first pawl sections 13 are caulked and the caulking sections 152 of the second pawl sections 15 are also caulked. At the time, all the caulking sections 132 are preferably caulked at one time and all the caulking sections 152 are also preferably caulked at one time. Furthermore, permanent magnets 181 and 182 are fitted into the through hollow sections 18. At the time, as shown in FIG. 7 serving as a vertical sectional partial view of the rotor 1, the permanent magnet 181 having the same polarity as that of the first magnetic pole 1A is disposed on the first pawl section 13 side of the through hollow sections 18, and the permanent magnet 182 having the same polarity as that of the second magnetic pole 1B is disposed on the second pawl section 15 side of the through hollow sections 18.

A magnet mainly made from neodymium or a magnet mainly made from ferrite can be used as the permanent magnets 181 and 182. More specifically, various kinds of permanent magnets, such as SmCo magnets, AlNiCo magnets or neodymium bonded magnets, can be used as the permanent magnets 181 and 182.

In the rotor 1 having been assembled as described above, since D1 is larger than D2 as mentioned previously, a clearance S1 (FIG. 4) is present between the first magnetic pole 1A and the second magnetic pole 1B in the radial direction. In other words, the first magnetic pole 1A and the second magnetic pole 1B do not make contact with each other in the radial direction. Moreover, a clearance S2 (FIGS. 2 and 4) formed by the step sections 131 of the first pawl sections 13 is present between the first annular section 11 of the first magnetic pole 1A and the rear end face of the rotor core 1C in the axial direction. What's more, a clearance S3 (FIGS. 2 and 3) formed by the step sections 151 of the second pawl sections 15 is present between the second annular section 14 of the second magnet pole 1B and the rear end face of the rotor core 1C in the axial direction.

Figure 7:
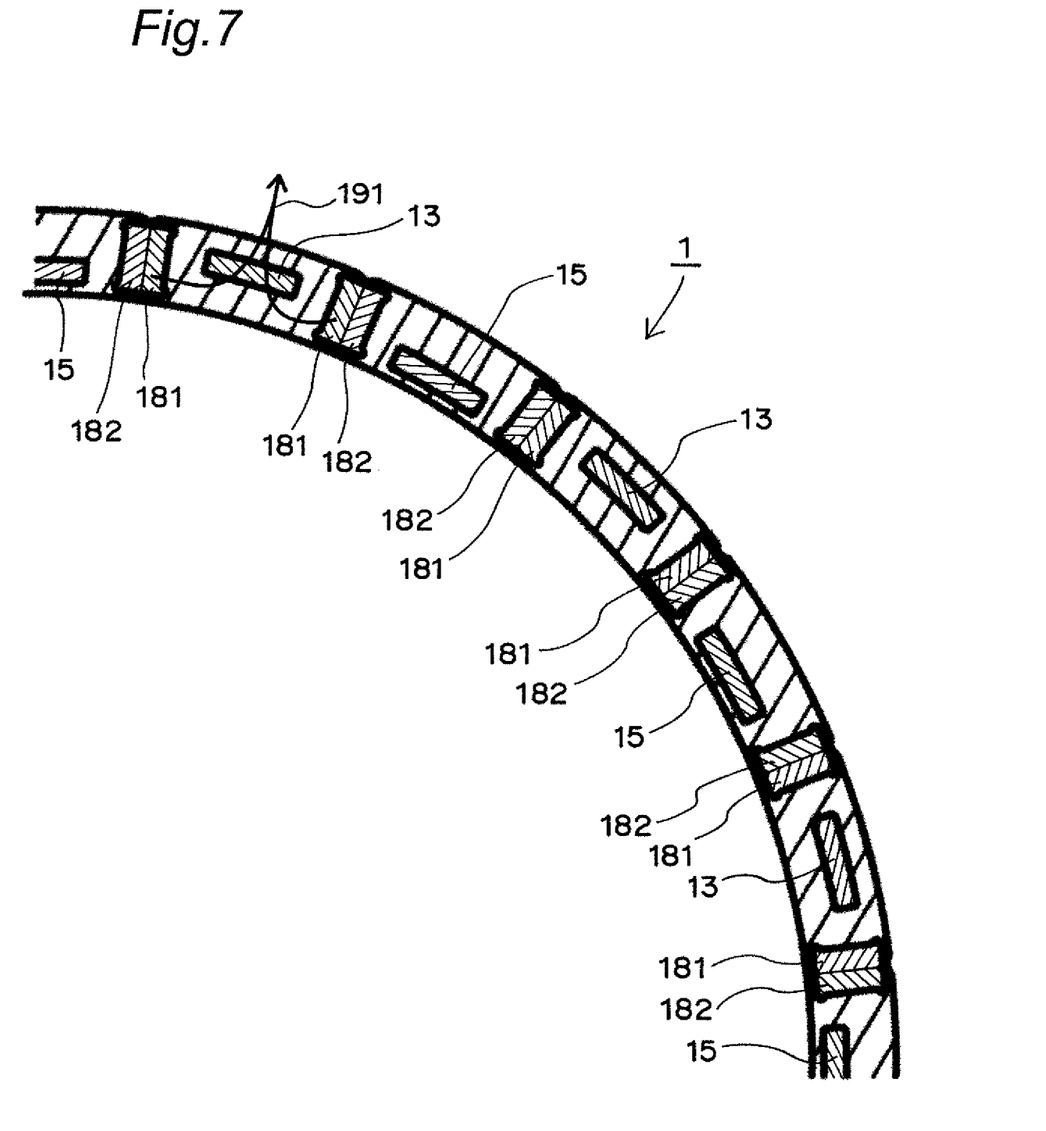
FIG. 7 is a vertical sectional partial view showing the rotor.

In the rotary electric machine 10 configured as described above, a magnetic flux 191 is first generated by the permanent magnets 181 and 182 as shown in FIG. 7. When the field coil 2 is energized, a magnetic flux 192 is further generated as shown in FIG. 1. The magnetic flux 192 is formed by starting from the field core 6 and returning to the field core 6 via the second air gap 102, the first magnetic pole 1A of the rotor 1, the first air gap 101, the stator 3, the first air gap 101, the second magnetic pole 1B of the rotor 1, and the second air gap 102. Since the first pawl sections 13 and the second pawl sections 15 have a thin-plate shape, the magnetic flux 192 is transmitted with a low magnetic resistance. At this time, for example, when a DC current is applied to the field coil 2, the magnetic flux 192 is generated, whereby the first magnetic pole 1A and the second magnetic pole 1B are magnetized to, for example, an N pole and an S pole, respectively.

With the rotary electric machine 10 configured as described above, a case in which a starting function is performed by using the rotary electric machine 10 as a starter will be described first. On the basis of a command for starting the engine 8, the stator 3 is magnetized by driving an inverter, not shown, and by applying a three-phase AC current to the stator 3, and a current is applied to the field coil 2. The first magnetic pole 1A and the second magnetic pole 1B of the rotor 1 are excited by applying the current to the field coil 2. As a result, the rotor 1 starts rotating with respect to the stator 3, and an electromotive force having an induction voltage is generated in the stator 3.

After that, the induction voltage increases as the rotation speed of the rotor 1 increases. When the rotation speed reaches an initial-explosion rotation speed that is lower than the idling rotation speed corresponding to the idling of the engine 8 and the starting of the engine 8 is completed, the driving of the inverter is stopped. And then, the operation mode of the rotary electric machine 10 is automatically shifted to a power generation mode in which the rotary electric machine 10 operates as a generator to perform a power generation function so that the induction voltage is maintained at a predetermined induction voltage (required voltage).

In this power generation mode, when the field coil 2 continues to be excited, the exciting current is adjusted so that the induction voltage becomes constant at the predetermined induction voltage. The exciting current is adjusted so that the magnetization force of the rotor decreases as the rotation speed increases, thereby making the induction voltage constant. Furthermore, in the case that the field coil 2 is not excited, the lead angle of the three-phase AC current is adjusted by the inverter so that the induction voltage becomes constant at the predetermined induction voltage. Moreover, the adjustment may be made by combining the above-mentioned two methods. With this control, when the rotor 1 is rotated, the rotary electric machine 10 functions as a generator.

As a result, the rotary electric machine 10 can start the engine and can function as a generator during vehicle traveling by connecting the rotary electric machine 10 to the engine 8.

With this embodiment, the following effects can be exerted.

(a) In the brushless winding field type rotary electric machine 10 disposed around the outer periphery of the starting device 4, the second air gap 102 between the field coil 2 and the rotor 1 is disposed on the flat plane perpendicular to the rotation shaft 7. In other words, the field coil 2 is disposed in parallel with the stator 3 and the rotor 1 while being shifted in the axial direction of the rotation shaft 7. Hence, only the two members, i.e., the stator 3 and the rotor 1, are provided on the radial outside of the starting device 4, whereby the disposition space for the field coil 2 is not required on the radial outside of the starting device 4. Therefore, the outer radial dimension of the starting device 4 becomes smaller by at least the amount of the disposition space for the field coil 2, or the thickness of the stator 3 or the rotor 1 can be increased by the amount of the disposition space, whereby the area around the outer periphery of the starting device 4 can be utilized effectively. Furthermore, the thickness of the field coil 2 in the radial direction can be increased and the magnetic flux of the field coil 2 can be made larger without considering the spaces for the stator 3 and the rotor 1. Consequently, the degree of freedom in design can be increased.

(b) The rotor core 1C is constituted by stacking the electromagnetic steel sheets in the axial direction of the rotation shaft 7. Hence, the "iron loss" in the rotor core 1C can be reduced. Consequently, the energy efficiency of the rotary electric machine 10 can be improved.

(c) In the rotor 1, since the first magnetic pole 1A is installed on the rotor core 1C by inserting the first pawl sections 13 into the first fitting sections 16 of the rotor core 1C from behind in the axial direction, the positioning of the first magnetic pole 1A with respect to the rotor core 1C in the circumferential direction and the radial direction can be performed easily. Furthermore, since the second magnetic pole 1B is installed on the rotor core 1C by inserting the second pawl sections 15 into the second fitting sections 17 of the rotor core 1C from behind in the axial direction, the positioning of the second magnetic pole 1B with respect to the rotor core 1C in the circumferential direction and the radial direction can be performed easily.

(d) In the rotor 1, since the first magnetic pole 1A is fixed to the rotor core 1C by caulking the caulking sections 132 of the first pawl sections 13, the positioning of the first magnetic pole 1A with respect to the rotor core 1C in the axial direction can be performed easily. Furthermore, since the second magnetic pole 1B is fixed to the rotor core 1C by caulking the caulking sections 152 of the second pawl sections 15, the positioning of the second magnetic pole 1B with respect to the rotor core 1C in the axial direction can be performed easily.

(e) Since the rotor core 1C is equipped with the permanent magnets 181 and 182, the magnetic flux 191 generated by the permanent magnets 181 and 182 can be used in addition to the magnetic flux 192 generated in the rotor 1 by the field coil 2, whereby the output performance of the rotary electric machine 10 can be improved.

(f) Since the forefront end plate of the rotor core 1C in the axial direction has rigidity higher than that of the other electromagnetic steel sheets, the endplate can prevent the rotor core 1C from being damaged when the caulking sections 132 and 152 are caulked and also has a function of preventing the forefront electromagnetic steel sheet in the axial direction from rolling up.

Modified Configuration (1) The rotor core 1C is not required to be equipped with the permanent magnets 181 and 182. However, even in this case, it is preferable that the through hollow sections 18 should be provided.

(2) The caulking sections 132 and 152 are not limited to the form that is expanded and caulked in the radial direction as in the above-mentioned embodiment, but may have a form that can be expanded and caulked in the circumferential direction or in both the radial direction and the circumferential direction.

(3) The position of the stator 3 may be replaced with the position of the field coil 2. In other words, the field coil 2 may be disposed on the radial outside of the rotor 1 and the stator 3 may be disposed while being shifted in the axial direction of the rotation shaft 7 of the rotor 1. In this case, the first air gap 101 between the rotor 1 and the stator 3 is formed as a gap extending along the radial direction perpendicular to the axial direction of the rotation shaft 7. On the other hand, the second air gap 102 between the field coil 2 and the rotor 1 is formed as a gap extending along the axial direction of the rotation shaft 7. With this configuration, in addition to working effects similar to those of the above-mentioned embodiment, it is not necessary to consider the change in the thickness of the rotor 1, such as expansion due to a centrifugal force, at the time of designing the stator 3.

(4) The rotary electric machine 10 may be disposed around the outer periphery of a rotary member other than the starting device 4. Examples of the other rotary members include a flywheel and a drive plate in a driving system.

(5) Although the rotary electric machine 10 is disposed between the engine 8 and the transmission 9 along the rotation shaft 7 in the above-mentioned embodiment, the rotary electric machine 10 is not limited to be disposed at such a position. The rotary electric machine 10 may be disposed at an arbitrary position; for example, the rotary electric machine 10 may be disposed so as to be replaced with an alternator or may be disposed between the transmission 9 and a vehicle wheel.

(6) The first magnetic pole, the second magnetic pole and the rotor core are not limited to have the forms according to the above-mentioned embodiment, but has the following forms, for example.

(6-1) The first magnetic pole has only the first pawl sections but does not have the first annular section. Furthermore, the second magnetic pole has only the second pawl sections but does not have the second annular section. In other words, each of the first magnetic pole and the second magnetic pole is formed of independently separated pawl sections.

(6-2) The rotor core does not have the first fitting sections and the second fitting sections, and the first magnetic pole and the second magnetic pole are fixed to the inner peripheral end of the rotor core.

INDUSTRIAL APPLICABILITY

The present invention is useful as a rotary electric machine for wide and general use in driving and power generating apparatuses, as well as a vehicle, thereby having a high industrial applicability.

DESCRIPTION OF REFERENCE NUMERALS

1: rotor
1A: first magnetic pole
11: first annular section
13: first pawl section
132: caulking section
1B: second magnetic pole
14: second annular section
15: second pawl section
152: caulking section
1C: rotor core
16: first fitting section
17: second fitting section
18: through hollow section
181, 182: permanent magnet
2: field coil
3: stator
31: AC coil
4: starting device
5: case
6: field core
7: rotation shaft
10: rotary electric machine

What is claimed is:

1. A brushless winding field type rotary electric machine positioned between a rotary member and a stationary case, comprising:
    a stator held in the stationary case and internally equipped with an AC coil for generating a rotating magnetic field by an AC current;
    a field core held in the stationary case and internally equipped with a field coil excited by a DC current; and
    a rotor disposed around an outer periphery of the rotary member and held so as to be rotatable with respect to the stator and the field coil, wherein
    the field coil is disposed in parallel with the rotor in an axial direction of a rotation shaft of the rotary member,
    the rotor is equipped with
    a first magnetic pole having a plurality of first pawl sections extending in the axial direction of the rotation shaft,
    a second magnetic pole having a plurality of second pawl sections extending in the axial direction of the rotation shaft, and
    a rotor core having an annular shape,
    the first magnetic pole and the second magnetic pole are fixed to the rotor core via the first pawl sections and the second pawl sections, respectively, without making contact with each other,
    the rotor core is constituted by stacking electromagnetic steel sheets in the axial direction of the rotation shaft, the stacked electromagnetic steel sheets are electrically insulated mutually with allowing a magnetic flux to pass through, the rotor core has first fitting sections into which the first pawl sections are fitted and second fitting sections into which the second pawl sections are fitted, the first fitting sections and the second fitting sections being provided alternately along a circumferential direction, and the first pawl sections of the first magnetic pole are fitted into the first fitting sections and the second pawl sections of the second magnetic pole are fitted into the second fitting sections, whereby the first magnetic pole and the second magnetic pole are fixed to the rotor core.

2. The rotary electric machine according to claim 1, wherein the first magnetic pole has a first annular section, the first pawl sections protrude from the first annular section in the axial direction of the rotation shaft, the second magnetic pole has a second annular section, and the second pawl sections protrude from the second annular section in the axial direction of the rotation shaft.

3. The rotary electric machine according to claim 1, wherein the rotor core has through hollow sections each disposed between the first fitting section and the second fitting section.

4. The rotary electric machine according to claim 3, wherein permanent magnets are disposed in the through hollow sections, and the permanent magnets are provided so that the permanent magnet on a side of the first pawl section has a same polarity as that of the first magnetic pole and so that the permanent magnet on a side of the second pawl section has a same polarity as that of the second magnetic pole.

5. The rotary electric machine according to claim 1, wherein each of the first pawl sections and the second pawl sections has a caulking section exposed from the rotor core ata tip end in the axial direction of the rotation shaft, and the first magnetic pole and the second magnetic pole are fixed in the axial direction of the rotation shaft by the caulking the caulking sections.

6. The rotary electric machine according to claim 5, wherein the rotor core has an end plate made from a nonmagnetic material and having rigidity higher than that of the electromagnetic steel sheets at the tip end side in the axial direction of the rotation shaft.

* * * * *